United States Patent
Hammond-Smith et al.

(10) Patent No.: US 7,297,292 B2
(45) Date of Patent: Nov. 20, 2007

(54) FLAKES COMPRISING NON-CHIRAL LIQUID CRYSTAL MATERIAL

(75) Inventors: Robert Hammond-Smith, Damerham (GB); Rodney Riddle, Poole (GB); John Patrick, Poole (GB)

(73) Assignee: Merck Patent Gesellschaft Mit Beschrankter Haftung, Darmstadt (DE)

( * ) Notice: Subject to any disclaimer, the term of this patent is extended or adjusted under 35 U.S.C. 154(b) by 220 days.

(21) Appl. No.: 10/520,063

(22) PCT Filed: Jun. 6, 2003

(86) PCT No.: PCT/EP03/05951

§ 371 (c)(1),
(2), (4) Date: Jan. 5, 2005

(87) PCT Pub. No.: WO2004/005425

PCT Pub. Date: Jan. 15, 2004

(65) Prior Publication Data

US 2005/0249889 A1     Nov. 10, 2005

(30) Foreign Application Priority Data

Jul. 6, 2002   (EP) ................... 02015129

(51) Int. Cl.
C09K 19/38 (2006.01)
C09K 19/52 (2006.01)
G03H 1/00 (2006.01)

(52) U.S. Cl. ............................ 252/299.01; 252/299.5; 428/1.1; 359/2

(58) Field of Classification Search ........... 252/299.01, 252/299.5, 299.1; 428/1.1; 359/2; 283/72
See application file for complete search history.

(56) References Cited

U.S. PATENT DOCUMENTS

| | | | | |
|---|---|---|---|---|
| 5,232,977 | A * | 8/1993 | Carter et al. ................ | 524/513 |
| 6,010,643 | A | 1/2000 | Coates et al. | |
| 6,013,197 | A | 1/2000 | Parri et al. | |
| 6,136,251 | A | 10/2000 | Etzbach et al. | |
| 6,203,736 | B1 | 3/2001 | Gailberger et al. | |
| 6,291,065 | B1 * | 9/2001 | Poetsch et al. ............. | 428/363 |
| 6,544,605 | B1 | 4/2003 | Verrall et al. | |
| 2002/0020829 | A1 | 2/2002 | Faris | |
| 2003/0017280 | A1 | 1/2003 | Poetsch et al. | |

FOREIGN PATENT DOCUMENTS

| | | | |
|---|---|---|---|
| EP | 1172201 | * | 1/2002 |
| GB | 2276883 | | 10/1994 |
| GB | 2280445 | | 2/1995 |
| GB | 2357061 | | 6/2001 |
| WO | WO 9804651 | | 2/1998 |
| WO | WO 9842799 | | 10/1998 |
| WO | WO 0047694 | | 8/2000 |

* cited by examiner

*Primary Examiner*—Shean C Wu
(74) *Attorney, Agent, or Firm*—Millen, White, Zelano & Branigan, P.C.

(57) ABSTRACT

The invention relates to liquid crystal flakes, to methods of their preparation and to their use as pigments for security or decorative applications or optical elements.

20 Claims, 1 Drawing Sheet

FLAKES COMPRISING NON-CHIRAL LIQUID CRYSTAL MATERIAL

FIELD OF THE INVENTION

The invention relates to liquid crystal flakes, to methods of their preparation and to their use as pigments for security or decorative applications or optical elements.

BACKGROUND AND PRIOR ART

In the area of security there is a need to provide materials that have non reproduceable effects and are preferably processable by printing on a substrate. Obvious effects include properties such as thermochromaticity and optically variable effects. Other features may be hidden such a the reflection of light with a certain polarisation state, infra-red reflecting or UV reflecting materials. These effects can only be seen with the use of viewing devices such as polarising films or specrophotometers.

Much work has focused on the use of cholesteric (or chiral nematic) liquid crystals (CLCs) as pigments. These pigments exhibit specific optical properties, such as angular colour dependence and reflection of circular polarised light, due to the chirality of the CLC material which induces a helically twisted molecular structure in the cholesteric phase. Suitable materials and methods of preparation of CLCs are described in prior art, for example in U.S. Pat No. 5,364,557 and U.S. Pat No. 5,599,412. Further descriptions of cholesteric pigment materials are given in GB 2 132 623, U.S. Pat No. 4,388,453 and WO 97/27251. The pigments described in these documents have three characteristic properties. Firstly, pigment particles are produced that reflect light within a specific range of wavelengths (dependent upon the composition of the LC material). Secondly the pigment particles have an angular dependent colour, i.e. the perceived colour changes as the viewing angle changes. Thirdly, the reflected light is circularly polarised, with the sense of polarisation being determined by the handedness of the chiral CLC material. However, CLC materials have several drawbacks. In general chiral materials for use in the CLC systems are difficult to prepare and expensive, especially if both chiral forms are required. Furthermore, for cholesteric materials an absorbing or black background is required to give best effects.

The use of nematic liquid crystal materials, which exhibit an untwisted liquid crystal phase, in birefringent films for security devices has also been reported in prior art. GB 2 357 061 describes a hot stamping foil for security applications, comprising a layer of polymerised or crosslinked nematic liquid crystal material with macroscopically uniform orientation applied onto a reflective layer. The birefringent nematic liquid crystal layer provides a hidden optical effect. The layer is invisible when viewed under unpolarised light, and produces a bright birefringence colour when viewed at between linear polarisers. The colour changes if the liquid crystal layer is rotated relatively to the polarisation direction of the polarisers.

However, the use of nematic materials as described in GB 2 357 061 has the following drawbacks. The materials need to be applied to a reflective background and subsequently cured using actinic radiation or transferred after polymerisation from a carrier film to a reflective film. In certain cases it may be necessary to pre-treat the substrate to ensure that the correct alignment of the materials is achieved. These steps are significantly different from standard printing processes and require additional machinery and techniques.

It was an aim of the present invention to provide new liquid crystal pigment particles, in particular for use in security devices, which do not have the disadvantages of prior art as discussed above. Another aim of the present invention was to provide methods of manufacturing the new liquid crystal pigments, which are especially suitable for mass production. Other aims of the present invention are immediately obvious to the expert from the following description.

It was found that the above aims can be achieved by providing solid liquid crystal flakes comprising a non-chiral liquid crystal material according to the present invention.

The flakes according to the present invention have several advantages compared to materials of prior art. For example, the use of chiral materials, which are difficult to prepare and expensive especially if both chiral forms are required, can be avoided. Furthermore, the nematic flakes of the present invention can produce a hidden image or hidden optical effect on a reflective background, whereas e.g. for cholesteric materials an absorbing or black background is required to give best effects.

Definition of Terms

The term 'flakes' as used in this application means small solid particles, preferably with dimensions of from 0.1 to 2000 µm, which are preferably platelet shaped and have average lateral dimensions that are several times larger than their thickness.

The term 'vitrified material' means a solidified glassy like, non-polymerised material.

The term 'non-chiral' material includes materials that consist exclusively of achiral compounds, as well as materials that consist of or comprise a racemate.

The term 'film' as used in this application includes self-supporting, i.e. free-standing, films or foils that show more or less pronounced mechanical stability and flexibility, as well as precoated, preprinted or laminated foils wherein the coating or printing can be partially or completely, as well as coatings or layers on a supporting substrate or between two or more substrates.

The term 'marking' includes films or coatings or layers covering the entire area of a substrate, as well as markings covering discrete regions of a substrate for example in the shape of a regular pattern or image.

The term 'liquid crystal or mesogenic material' or 'liquid crystal or mesogenic compound' should denote materials or compounds comprising one or more rod-shaped, board-shaped or disk-shaped mesogenic groups, i.e. groups with the ability to induce liquid crystal phase behavior. Liquid crystal compounds with rod-shaped or board-shaped groups are also known in the art as 'calamitic' liquid crystals. Liquid crystal compounds with a disk-shaped group are also known in the art as 'discotic' liquid crystals. The compounds or materials comprising mesogenic groups do not necessarily have to exhibit a liquid crystal phase themselves. It is also possible that they show liquid crystal phase behavior only in mixtures with other compounds, or when the mesogenic compounds or materials, or the mixtures thereof, are polymerized.

For the sake of simplicity, the term 'liquid crystal material' is used hereinafter for both liquid crystal materials and mesogenic materials, and the term 'mesogen' is used for the mesogenic groups of the material.

The term 'director' is known to the expert and means the preferred orientation direction of the long molecular axes (in case of calamitic compounds) or short molecular axis (in case of discotic compounds) of the mesogens in a liquid crystal material.

The term 'planar structure', 'planar alignment' or 'planar orientation' refers to a layer or film of liquid crystal material wherein the director is substantially parallel to the plane of the film or layer.

The term 'homeotropic structure', 'homeotropic alignment' or 'homeotropic orientation' refers to a layer or film of liquid crystal material wherein the director is substantially perpendicular to the film plane, i.e. substantially parallel to the film normal.

The term 'tilted structure', 'tilted alignment' or 'tilted orientation' refers to a layer or film of liquid crystal material wherein the director is tilted at an angle of between 0 and 90 degrees relative to the film plane.

The term 'splayed structure', 'splayed alignment' or 'splayed orientation' means a tilted orientation as defined above, wherein the tilt angle varies monotonuously in the range from 0 to 90°, preferably from a minimum to a maximum value, in a direction perpendicular to the film plane.

For sake of simplicity, a film comprising liquid crystal material with a planar, homeotropic, tilted or splayed orientation, alignment or structure is hereinafter also referred to as 'planar film', 'homeotropic film', 'tilted film' and 'splayed film', respectively.

DETAILED DESCRIPTION OF THE INVENTION

The invention relates to flakes comprising a non-chiral liquid crystal material.

The invention further relates to a process of preparing flakes as described above and below by providing a non-chiral polymerisable liquid crystal material onto a substrate, polymerising the material, optionally removing the polymerised material from the substrate and processing it to form flakes.

The invention relates to flakes and processes as described above and below wherein the liquid crystal material does not comprise chiral compounds.

The invention further relates to flakes and processes as described above and below wherein the liquid crystal material does not have a helically twisted structure.

The invention further relates to flakes and processes as described above and below wherein the liquid crystal material does not show selective reflection of wavelengths in or below the IR range.

The invention further relates to the use of flakes as described above and below as pigments in inks or paints.

The invention further relates to an ink comprising one or more types of flakes as described above and below dispersed in a light transmissive binder.

The invention further relates to a film or coating of an ink as described above and below provided on a substrate.

The invention further relates to the use of flakes or an ink as described above and below for decorative or security applications, security markings or security threads, systems of verification or authentification of documents or objects, or optical elements.

The invention further relates to a security marking comprising flakes or an ink as described above and below provided on a reflective substrate.

The invention further relates to a document comprising a security marking as described above and below.

The invention further relates to a method of verification of a document as described above and below by observing said document through one or more linear or circular polarisers.

DETAILED DESCRIPTION OF THE INVENTION

Preferred embodiments of the present invention relate to
- flakes wherein the liquid crystal material is a nematic or smectic liquid crystal material.
- flakes wherein the liquid crystal material is polymerised, crosslinked or vitrified.
- flakes that comprise two or more layers of liquid crystal material.
- flakes wherein the liquid crystal material has macroscopically uniform orientation.
- flakes wherein the liquid crystal material has planar orientation.
- flakes that are platelet shaped.
- flakes that have lateral dimensions of from 10 to 2000 microns, preferably from 300 to 500 microns, and a thickness of from 0.5 to 5 microns, preferably from 0.75 to 1.5 microns.
- flakes that have a diameter:thickness ratio of from 10:1 to 1000:1, preferably from 20:1 to 500:1, very preferably from 50:1 to 300:1.
- an ink that comprises one or more types of optically variable pigments in addition to the flakes of the present invention.
- an ink wherein the additional pigments are selected from.
- an ink wherein the ratio of the total amount of flakes and additional pigments to the binder is from 1:0.5 to 1:10, preferably from 1:2 to 1:4, very preferably approximately 1:3.
- a film or coating film or coating of an ink as described above and below provided on a substrate, wherein the thickness of said film or coating is from 1 to 20 microns, preferably from 5 to 15 microns.
- a film or coating as described above and below, wherein the number of layers of flakes and pigments is from 1 to 20, preferably from 2 to 6.
- a film or coating as described above and below provided on a substrate, wherein the substrate is a reflective substrate.

The inventors have discovered that polymerisable achiral liquid crystal materials, in particular nematic liquid crystal materials, can be coated onto polymer substrates, polymerised and then flaked to produce pigment particles. These particles can be introduced into a suitable printing binder to prepare a more conventional printing ink. This ink can be applied by standard printing technology and can be applied to any reflective substrate without the need for pre-treatment.

Figure 1:
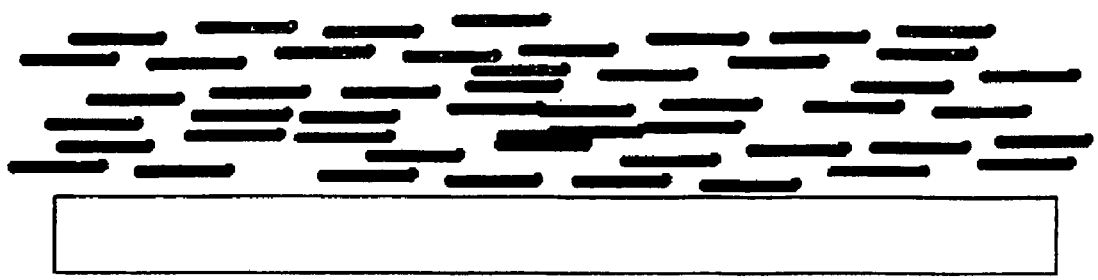
FIG. 1 schematically depicts a coating of liquid crystal flakes according to the invention in a binder provided on a substrate.
Figure 2:
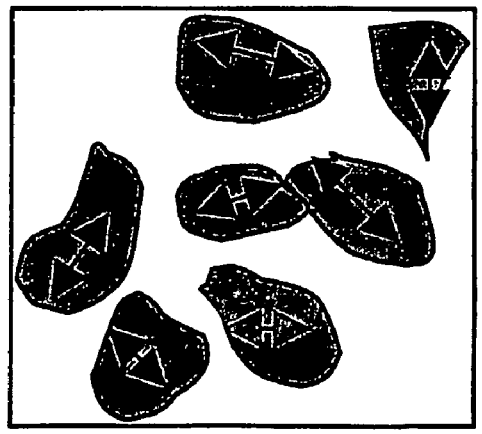
FIG. 2 schematically depicts a layer of nematic liquid crystal flakes in top view with the director of different flakes oriented in different directions.

In a preferred embodiment of the present invention the flakes are platelet-shaped, with a preferred diameter to thickness ratio of from from 10:1 to 1000:1, preferably from 20:1 to 500:1, very preferably from 50:1 to 300:1. Because of the platelet shape of the nematic liquid crystal flakes, when applied to a substrate they will align parallel to the substrate, as depicted in FIG. 1. However, the director of each nematic liquid crystal flake will lie in a different direction, as shown in FIG. 2.

In addition to each individual flake in each layer having a different director angle subsequent layers will also have different director angles. In the case of infinite layers of flakes this would result in a loss of birefringence in the overall layer since every particle would be matched by another particle with the director at 90° to the first. However, depending upon the thickness of the individual flakes, the concentration of flake particles in the binder system and the thickness of the printed layer only a few layers of flakes will be deposited. The resulting birefringence would then vary from point to point over the surface of the film.

Very preferably each individual particle has a thickness of 0.75 to 1.5 microns and the printed layer has a thickness of from 5 to 10 microns. The pigment to binder ratio is preferably 1:1. This allows 5-10 layers of nematic liquid crystal flakes in the coating.

In addition, it is possible to combine the nematic liquid crystal flakes with optically variable pigments, like for example pearlescent or iridescent pigments to prepare an ink. In this case the iridescent pigment particles will provide the reflective background and thereby allow the ink to be applied to non-reflective substrates.

Suitable pearlescent or interference pigments are e.g. mica, $SiO_2$, $Al_2O_3$, $TiO_2$ or glass flakes that are coated with one or more layers of e.g. titanium dioxide, iron oxide, titanium iron oxide or chrome oxide or combinations thereof, flakes comprising combinations of metal and metal oxide, metal flakes of e.g. aluminium coated with layers of iron oxide layers and/or silicium dioxide. These pigments are known to the expert and are commercially available in a wide variety. Preferred pigments are for example the commercially available Iriodin®, Colourstream® or Xirallic® (from Merck KGaA, Darmstadt, Germany), or Paliochrome® (from BASF AG, Ludwigshafen, Germany), or optically variable pigments e.g. from Flex Corp.

Preferred reflective substrates are metallic or metallised substrates, i.e. substrates incorporating or being covered by one or more metal layers. In addition these substrates may also be part of a hot stamping foil or of a holographic image. Metal substrates or metallised layers can be selected e.g of Al, Cu, Ni, Ag, Cr or alloys like e.g. Pt—Rh or Ni—Cr, or layers comprising one or more metal flakes dispersed in a light transmissive binder. Suitable metal flakes are e.g. flakes aluminium, gold or titan, or metal oxide flakes of e.g. $Fe_2O_3$ and/or $TiO_2$. Preferably the substrate comprises a surface of metal, in particular of aluminium, at the substrate—liquid crystal layer interface.

Suitable substrates include films, paper, board, leather, cellulose sheeting, textiles, plastics, glass, ceramics and metals. Suitable polymer films are for example polyester such as polyethyleneterephthalate (PET) or polyethylenenaphthalate (PEN), polyvinylalcohol (PVA), polycarbonate (PC) or triacetylcellulose (TAC), especially preferably PET or TAC. Especially preferred are substrates metallised with aluminium, or aluminium foils.

The substrate or at least the surface of the substrate printed with the liquid crystal flakes or ink is preferably flat, like e.g. a foil, film or sheet, and has preferably a thickness smaller than 200 µm, in particular smaller than 60 µm, most preferably smaller than 20 µm.

The substrate surface is preferably planar, but may also be structured, patterned and/or have a relief. The shape, structure, pattern and/or relief of the substrate is preferably adapted to the desired application of the inventive birefringent marking. Suitable structuring and patterning techniques are well known to the one skilled in the art, in particular in the fields of precision engineering and microtechnology, and include but are not limited to lithography, etching, cutting, stamping, punching, embossing, molding and electron discharge machining techniques.

It is also possible to use a reflective substrate comprising a hologram or kinegram or common holographic optical element (HOE), a holographic layer with an embossed, patterned or structured surface, or a layer of reflective holographic pigments. Light reflected by higher regions of the structured surface will interfer with light reflected by lower regions of the structured surface, thereby forming a holographic image. The preparation of holographic layers is described for example in U.S. Pat. No. 4,588,664, the entire disclosure of which is incorporated into this application by reference.

Thus, for example a substrate like e.g. a banknote, or selected regions thereof, can be printed or coated with a hologram or reflective metal layer, onto which the liquid crystal flakes or the ink according to the invention are applied. Alternatively a film or coating of an ink according to the invention may be prepared separately on a reflective substrate which is then applied to the document of value for example as security thread or as another form of a security marking.

This embodiment is particularly suitable for use as falseproof security threads or holograms on banknotes or documents of value, providing a security marking by which the banknote is easy to authenticate when viewed through a polariser.

The ink or flakes according to the present invention material may be applied onto one side or on both sides of the reflective substrate. They may be printed onto discrete regions of the substrate to form a pattern or image that is for example visible under unpolarised light due to a change in the surface gloss in the printed areas, or may be invisible under unpolarised light and become visible only when viewed through a polariser. Alternatively they may be printed onto the entire substrate to form a continuous layer or film that becomes visible only when viewed through a polariser.

Preferably a security marking is prepared by printing an ink comprising the liquid crystal flakes and a binder solvent onto the. reflective substrate and allowing the solvent to evaporate before or during polymerisation. The mixture can be a solution, dispersion or emulsion of the liquid crystal material in the solvent. Preferably a solution is used. The solvent may evaporate with or without the use of external forces such as heat or reduced pressure.

The liquid crystal flakes or the ink according to the present invention can be printed onto the substrate by conventional printing techniques which are known to the expert, including for example screen printing, offset printing, dry offset printing reel-to-reel printing, letter press printing, gravure printing, rotogravure printing, flexographic printing, intaglio printing, pad printing, heat-seal printing, ink-jet printing, thermal transfer printing or printing by means of a stamp or printing plate.

The liquid crystal flakes or ink can also be coated onto the substrate by conventional coating techniques which are known to the expert, including for example spray coating, reel -to-reel coating, dipping, etc.

The ink comprising the liquid crystal flakes additionally comprises a light transmissive binder, for example a polymeric binder or one or more monomers capable of forming a polymeric binder and/or one or more dispersion auxiliaries. Suitable binders and dispersion auxiliaries are disclosed for example in WO 96/02597.

The LC material for preparing the flakes is preferably a nematic or smectic LC material. Nematic LC materials are especially preferred.

Preferably the liquid crystal material is a polymerisable or crosslinkable material, preferably dissolved in an organic solvent, which is polymerised or crosslinked by in-situ polymerisation during or after evaporation of the solvent.

Preferably the liquid crystal flakes are prepared from a polymerisable nematic or smectic, preferably nematic liquid crystal material by in-situ polymerisation. In a preferred method of preparation the polymerisable material is coated onto a substrate, oriented into planar orientation and subsequently polymerised for example by exposure to heat or actinic radiation. The preparation of a planar nematic film is described for example in WO 98/04651, the entire disclosure of which is incorporated into this application by reference.

The polymerisable liquid crystal material preferably comprises at least one monoreactive achiral polymerisable mesogenic compound and at least one di- or multireactive achiral polymerisable mesogenic compound.

If di- or multireactive compounds are present in the polymerisable material, a three-dimensional polymer network is formed and the planar orientation of the LC material is permanently fixed. A polymer film made of such a network is self-supporting and shows a high mechanical and thermal stability and a low temperature dependence of its physical and optical properties.

By varying the concentration of the di- and multireactive compounds the crosslink density of the polymer film and thereby its physical and chemical properties such as the glass transition temperature, which is also important for the temperature dependence of the optical properties of the optical retardation film, the thermal and mechanical stability or the solvent resistance can be tuned easily.

A preferred polymerisable liquid crystal material comprises 5-60% of one or more direactive achiral mesogenic compounds,
20-90% of one or more monoreactive achiral mesogenic compounds,
0.1 to 10% of one or more surfactants,
0.1 to 10% of one or more photoinitiators.

The polymerisable mesogenic mono-, di- or multireactive compounds used for the instant invention can be prepared by methods which are known per se and which are described, for example, in standard works of organic chemistry such as, for example, Houben-Weyl, Methoden der organischen Chemie, Thieme-Verlag, Stuttgart. Typical examples are described for example in WO 93/22397; EP 0 261 712; DE 19504224; DE 4408171 and DE 4405316. The compounds disclosed in these documents, however, are to be regarded merely as examples that do not limit the scope of this invention.

Examples representing especially useful mono- or direactive polymerisable mesogenic compounds are shown in the following list of compounds, which should, however, be taken only as illustrative and is in no way intended to restrict, but instead to explain the present invention:

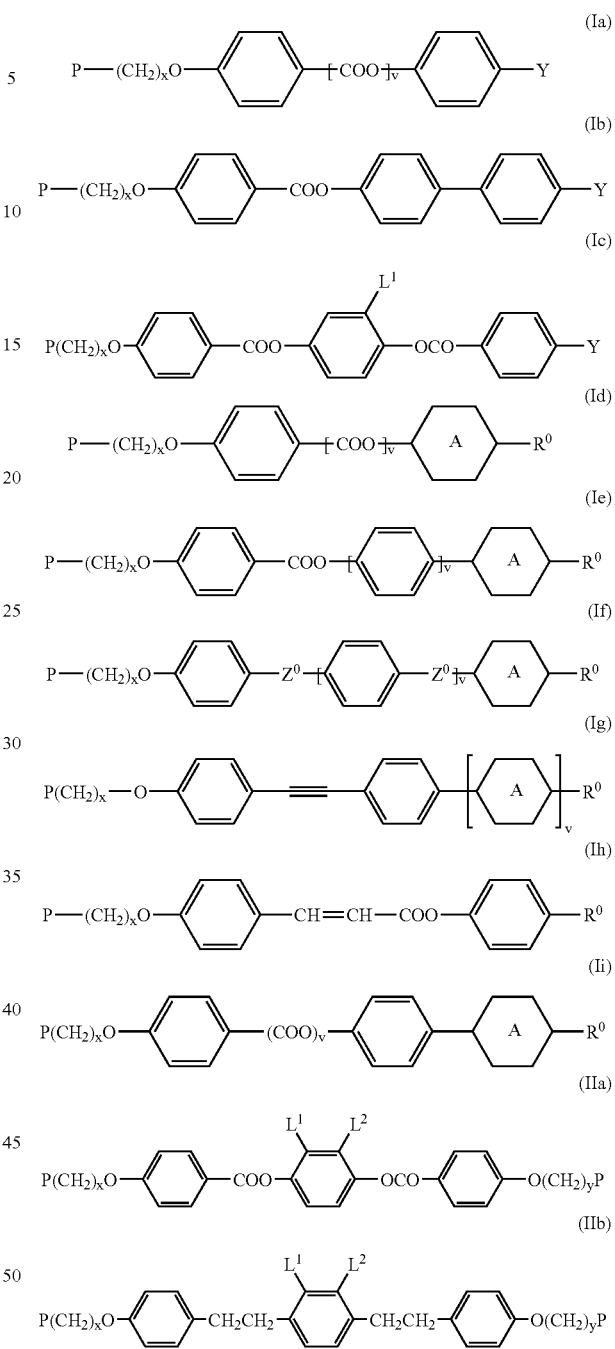

In the above formulae, P is a polymerisable group, preferably an acryl, methacryl, vinyl, vinyloxy, propenyl ether, epoxy or styryl group, x and y are each independently 1 to 12, A is 1,4-phenylene that is optionally mono- di or trisubstituted by $L^1$ or 1,4-cyclohexylene, v is 0 or 1, $Z^0$ is —COO—, —OCO—, —CH$_2$CH$_2$—, —C≡C— or a single bond, Y is a polar group, $R^0$ is an non-polar alkyl or alkoxy group, and $L^1$ and $L^2$ are each independently H, F, Cl, CN or an optionally halogenated alkyl, alkoxy, alkylcarbonyl, alkoxycarbonyl or alkoxycarbonyloxy group with 1 to 7 C atoms.

The term 'polar group' in this connection means a group selected from F, Cl, CN, $N_{O2}$, OH, OCH$_3$, OCN, SCN, an optionally fluorinated carbonyl or carboxyl group with up to 4 C atoms or a mono- oligo- or polyfluorinated alkyl or alkoxy group with 1 to 4 C atoms. The term 'non-polar group' means an alkyl group with 1 or more, preferably 1 to 12 C atoms or an alkoxy group with 2 or more, preferably 2 to 12 C atoms.

Polymerisation of the polymerisable LC material takes place by exposing it to heat or actinic radiation. Actinic radiation means irradiation with light, like UV light, IR light or visible light, irradiation with X-rays or gamma rays or irradiation with high energy particles, such as ions or electrons. Preferably polymerisation is carried out by UV irradiation. As a source for actinic radiation for example a single UV lamp or a set of UV lamps can be used. When using a high lamp power the curing time can be reduced. Another possible source for actinic radiation is a laser, like e.g. a UV laser, an IR laser or a visible laser.

The polymerisation is carried out in the presence of an initiator absorbing at the wavelength of the actinic radiation. For example, when polymerising by means of UV light, a photoinitiator can be used that decomposes under UV irradiation to produce free radicals or ions that start the polymerisation reaction. When curing polymerisable mesogens with acrylate or methacrylate groups, preferably a radical photoinitiator is used, when curing polymerisable mesogens with vinyl and epoxide groups, preferably a cationic photoinitiator is used. It is also possible to use a polymerisation initiator that decomposes when heated to produce free radicals or ions that start the polymerisation. As a photoinitiator for radical polymerisation for example the commercially available Irgacure 651, Irgacure 184, Darocure 1173 or Darocure 4205 (all from Ciba Geigy AG) can be used, whereas in case of cationic photopolymerisation the commercially available UVI 6974 (Union Carbide) can be used. The polymerisable LC material preferably comprises 0.01 to 10%, very preferably 0.05 to 5%, in particular 0.1 to 3% of a polymerisation initiator. UV photoinitiators are preferred, in particular radicalic UV photoinitiators.

The curing time is dependent, inter alia, on the reactivity of the polymerisable mesogenic material, the thickness of the printed layer, the type of polymerisation initiator and the power of the UV lamp. The curing time according to the invention is preferably not longer than 10 minutes, particularly preferably not longer than 5 minutes and very particularly preferably shorter than 2 minutes. For mass production short curing times of 3 minutes or less, very preferably of 1 minute or less, in particular of 30 seconds or less, are preferred.

In a preferred embodiment the liquid crystal material comprises an additive that induces or enhances planar alignment of the liquid crystal material on the substrate. Preferably the additive comprises one or more surfactants. Suitable surfactants are described for example in J. Cognard, Mol.Cryst.Liq.Cryst. 78, Supplement 1, 1-77 (1981). Particularly preferred are non-ionic surfactants, very fluorocarbon surfactants, like for example the commercially available fluorocarbon surfactants Fluorad FC-171® (from 3M Co.), or Zonyl FSN ® (from DuPont).

Suitable and preferred fluorocarbons surfactant are for example those of formula I

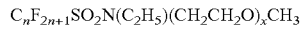

$$C_nF_{2n+1}SO_2N(C_2H_5)(CH_2CH_2O)_xCH_3 \qquad I$$

wherein n is an integer from 4 to 12 and x is an integer from 5 to 15, which are commercially available as Fluorad FC-171 ® (from 3M Co.).

The lower limit of the amount of the additives inducing planar alignment in the polymerisable liquid crystal material is preferably 0.01 weight %, in particular 0.05 weight %, most preferably 0.1 weight % of the liquid crystal material. The upper limit of the amount of said compounds is preferably 5 weight %, in particular 3 weight %, most preferably 1.5 weight % of the liquid crystal material.

The inventive polymerisable liquid crystalline mixtures can additionally comprise one or more other suitable components or additives such as, for example, catalysts, sensitizers, stabilizers, inhibitors, co-reacting monomers, surface-active compounds, lubricating agents, wetting agents, dispersing agents, hydrophobing agents, adhesive agents, flow improvers, defoaming agents, deaerators, diluents, reactive diluents, auxiliaries, colourants, dyes or pigments.

Suitable additives are disclosed for example in WO 00/47694, the entire disclosure of which is incorporated into this application by reference.

In particular the addition of stabilizers is preferred in order to prevent undesired spontaneous polymerisation of the polymerisable material for example during storage. As stabilizers in principal all compounds can be used that are known to the skilled in the art for this purpose. These compounds are commercially available in a broad variety. Typical examples for stabilizers are 4-ethoxyphenol or butylated hydroxytoluene (BHT).

Other additives, like e.g. chain transfer agents, can also be added to the polymerisable LC material in order to modify the physical properties of the resulting polymer film. When adding a chain transfer agent, such as monofunctional thiol compounds like e.g. dodecane thiol or multifunctional thiol compounds like e.g. trimethylpropane tri(3-mercaptopropionate), to the polymerisable material, the length of the free polymer chains and/or the length of the polymer chains between two crosslinks in the inventive polymer film can be controlled. When the amount of the chain transfer agent is increased, the polymer chain length in the obtained polymer film is decreasing.

It is also possible, in order to increase crosslinking of the polymers, to add up to 20% of a non mesogenic compound with two or more polymerisable functional groups to the polymerisable LC material alternatively or in addition to the di- or multifunctional polymerisable mesogenic compounds to increase crosslinking of the polymer. Typical examples for difunctional non mesogenic monomers are alkyldiacrylates or alkyldimethacrylates with alkyl groups of 1 to 20 C atoms. Typical examples for non mesogenic monomers with more than two polymerisable groups are trimethylpropanetrimethacrylate or pentaerythritoltetraacrylate.

In another preferred embodiment the mixture of polymerisable material comprises up to 70%, preferably 3 to 50% of a non mesogenic compound with one polymerisable functional group. Typical examples for monofunctional non mesogenic monomers are alkylacrylates or alkylmethacrylates.

It is also possible to add, for example, a quantity of up to 20% by weight of a non polymerisable liquid-crystalline compound to adapt the optical properties of the resulting polymer film.

The polymerisation is preferably carried out in the liquid crystal phase of the polymerisable LC material. Therefore, preferably polymerisable mesogenic compounds or mixtures with low melting points and broad liquid crystal phase ranges are used. The use of such materials allows to reduce the polymerisation temperature, which makes the polymerisation process easier and is a considerable advantage especially for mass production. The selection of suitable polymerisation temperatures depends mainly on the clearing point of the polymerisable material and inter alia on the softening point of the substrate. Preferably the polymerisation temperature is at least 30 degrees below the clearing temperature of the polymerisable mesogenic mixture. Polymerisation temperatures below 120° C. are preferred. Especially preferred are temperatures below 90° C., in particular temperatures of 60° C. or less.

The security marking according to the present invention can be used for direct application e.g. onto an article, device or document, or as threads, holograms or hot stamping foils for decorative or security applications, to authenticate and prevent counterfeiting of documents of value, for identification of hidden images, informations or patterns. It can be applied to consumer products or household objects, car bodies, foils, packing materials, clothes or woven fabric, incorporated into plastic, or applied as security markings or threads on documents of value like banknotes, credit cards or ID cards, national ID documents, licenses or any product with money value, like stamps, tickets, shares, cheques etc.

Without further elaboration, it is believed that one skilled in the art can, using the preceding description, utilize the present invention to its fullest extent. The following examples are, therefore, to be construed as merely illustrative and not limitative of the remainder of the disclosure in any way whatsoever.

In the foregoing and in the following examples, unless otherwise indicated, all temperatures are set forth uncorrected in degrees Celsius and all parts and percentages are by weight.

EXAMPLE 1

The following polymerisable mixture was prepared
Compound (A) 1.72%
Compound (B) 4.20%
Compound (C) 3.24%
Compound (D) 4.02%
lrgacure 907 0.91%
Fluorad FC 171 0.07%
Toluene 85.83%

Irgacure 907 is a commercially available photoinitiator (Ciba Geigy). Fluorad FC 171 is a commercially available surfactant (3M Inc.).

This mixture was coated onto a PET substrate. The coating was then passed through an oven to remove excess solvent and also to anneal the liquid crystal mixture. The aligned liquid crystal mixture was then cured, in an air atmosphere using UV radiation. The cured polymer film was then removed from the substrate and ground to produce flaked pigment particles. The thickness of the final flakes was 1.2 microns.

The pigments produced were mixed with an equal amount of UV curable lacquer and coated onto the metallised side of a 12 μm metallised black PET film producing a 12 μm thick film. This film was cured using UV radiation.

When viewed through a linear polariser the coated area appeared predominantly dark against the metallic substrate. As the linear polariser was rotated slight changes of the dark areas were noticed as the local director direction changed.

When viewed through a circular polariser (left or right handed) the coated areas stood out very clearly against a dark background. No effect was seen as the circular polariser was rotated.

The invention claimed is:

1. A decorative application, security application, security marking, security thread, or system for the verification or authentification of a document or object comprising flakes which comprise a polymerized, crosslinked or vitrified non-chiral liquid crystal material, which flakes are in said decorative application, security application, security marking, security thread, or system of verification or authentification of a document or object.

2. A decorative application, security application, security marking, security thread, or system of verification or authentification of a document or object according to claim 1, wherein the liquid crystal material is a nematic or smectic liquid crystal material.

3. A decorative application, security application, security marking, security thread, or system of verification or authen-

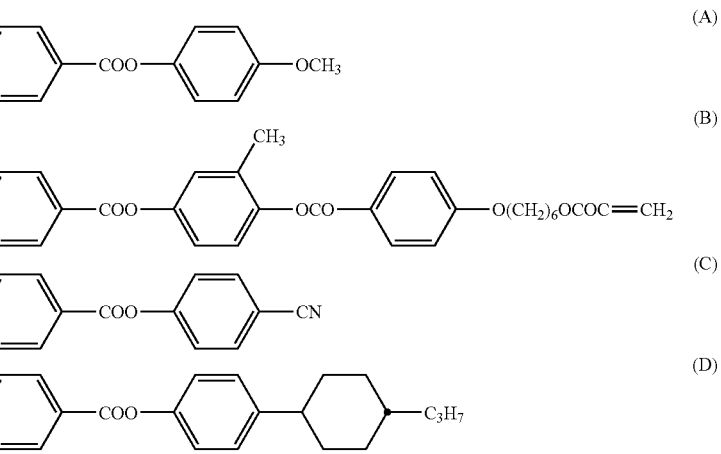

Compounds (A), (B) and (C) can be prepared according to or in analogy to the methods described in D. J. Broer et al., Makromol. Chem. 190, 3201-3215 (1989). Compound (D) and its preparation are described in GB 2,280,445.

tification of a document or object according to claim 1, wherein the liquid crystal material is polymerised.

4. A decorative application, security application, security marking, security thread, or system of verification or authentification of a document or object according to claim 1, wherein the flakes comprise two or more layers of liquid crystal material.

5. A decorative application, security application, security marking, security thread, or system of verification or authentification of a document or object according to claim 1, wherein the liquid crystal material has uniform orientation.

6. A decorative application, security application, security marking, security thread, or system of verification or authentification of a document or object according to claim 1, wherein the liquid crystal material has planar orientation.

7. A decorative application, security application, security marking, security thread, or system of verification or authentification of a document or object according to claim 1, wherein the flakes are platelet shaped.

8. A decorative application, security application, security marking, security thread, or system of verification or authentification of a document or object according to claim 7, wherein the flakes have lateral dimensions of 10 to 2000 microns and a thickness of 0.5 to 5 microns.

9. A process for preparing a decorative application, security application, security marking, security thread, or system of verification or authentification of a document or object according to claim 1, comprising providing an achiral polymerizable liquid crystal material onto a substrate, polymerizing the material, optionally removing the polymerized material from the substrate and processing it to form flakes.

10. A decorative application, security application, security marking, security thread, or system of verification or authentification of a document or object according to claim 1, which comprises an ink in which said flakes are dispersed in a light transmissive binder.

11. A decorative application, security application, security marking, security thread, or system of verification or authentification of a document or object according to claim 10, wherein the ink further comprises one or more types of optically variable pigments.

12. A decorative application, security application, security marking, security tread, or system of verification or authentification of a document or object according to claim 1, which comprises an ink in which the flakes are dispersed in a light transmissive binder in the form of a film or coating on a substrate.

13. A decorative application, security application, security marking, security thread, or system of verification or authentification of a document or object according to claim 1, which is a security marking.

14. A decorative application, security application, security marking, security thread, or system of verification or authentification of a document or object according to claim 1, which is a security marking on a reflective substrate.

15. A decorative application, security application, security marking, security thread, or system of verification or authentification of a document or object according to claim 1, which is a security marking on a document.

16. A method for verification of a document according to claim 15, comprising observing said document through one or more linear or circular polarisers.

17. A security marking, security thread, or system for the verification or authentification of a document or object comprising flakes which comprise a polymerized, crosslinked or vitrified non-chiral liquid crystal material, which flakes are in said security marking, security thread, or system of verification or authentification of a document or object.

18. A security marking, security thread, or system of verification or authentification of a document or object according to claim 17, wherein the liquid crystal material is a nematic or smectic liquid crystal material.

19. A security marking, security thread, or system of verification or authentification of a document or object according to claim 17, which is a security marking or a security thread.

20. A security marking, security thread, or system of verification or authentification of a document or object according to claim 17, which comprises an ink in which the flakes are dispersed in a light transmissive binder in the form of a film or coating on a substrate.

* * * * *

UNITED STATES PATENT AND TRADEMARK OFFICE
CERTIFICATE OF CORRECTION

PATENT NO. : 7,297,292 B2 Page 1 of 1
APPLICATION NO. : 10/520063
DATED : November 20, 2007
INVENTOR(S) : Robert Hammond-Smith It is certified that error appears in the above-identified patent and that said Letters Patent is hereby corrected as shown below:

Column 13, line 39, reads "security tread," should read -- security thread, --

Signed and Sealed this

Thirteenth Day of May, 2008

JON W. DUDAS
*Director of the United States Patent and Trademark Office*